United States Patent [19]

Marino

[11] 3,934,088
[45] Jan. 20, 1976

[54] DATA TERMINAL FOR CONNECTION TO TELEPHONE OR TELEPRINTER FACILITIES

[75] Inventor: Francis C. Marino, Dix Hills, N.Y.

[73] Assignee: Redactron Corporation, Hauppauge, N.Y.

[22] Filed: June 13, 1974

[21] Appl. No.: 479,051

[52] U.S. Cl. ............................... 179/2 DP; 178/3
[51] Int. Cl.² ................. H04M 11/00; H04M 11/02
[58] Field of Search.......... 179/2 DP, 2 A, 1 C, 2 C, 179/3, 4; 307/29, 38

[56] References Cited
UNITED STATES PATENTS

| | | | |
|---|---|---|---|
| 3,213,200 | 10/1965 | Vogelman et al. | 179/3 |
| 3,227,806 | 1/1966 | Kreuzer | 179/3 |
| 3,305,839 | 2/1967 | Looschen et al. | 179/2 DP |
| 3,344,401 | 9/1967 | MacDonald et al. | 179/2 DP |
| 3,636,257 | 1/1972 | Dixon | 179/3 |
| 3,684,832 | 8/1972 | Marguth | 179/2 DP |
| 3,842,207 | 10/1974 | Fretwell | 179/2 DP |

Primary Examiner—William C. Cooper
Assistant Examiner—George G. Stellar
Attorney, Agent, or Firm—Hane, Baxley & Spiecens

[57] ABSTRACT

A data communication terminal with a single data communications means is selectively connected via a first data coupler to a dialed telephone facility or via a second data coupler to a teleprinter facility.

2 Claims, 1 Drawing Figure

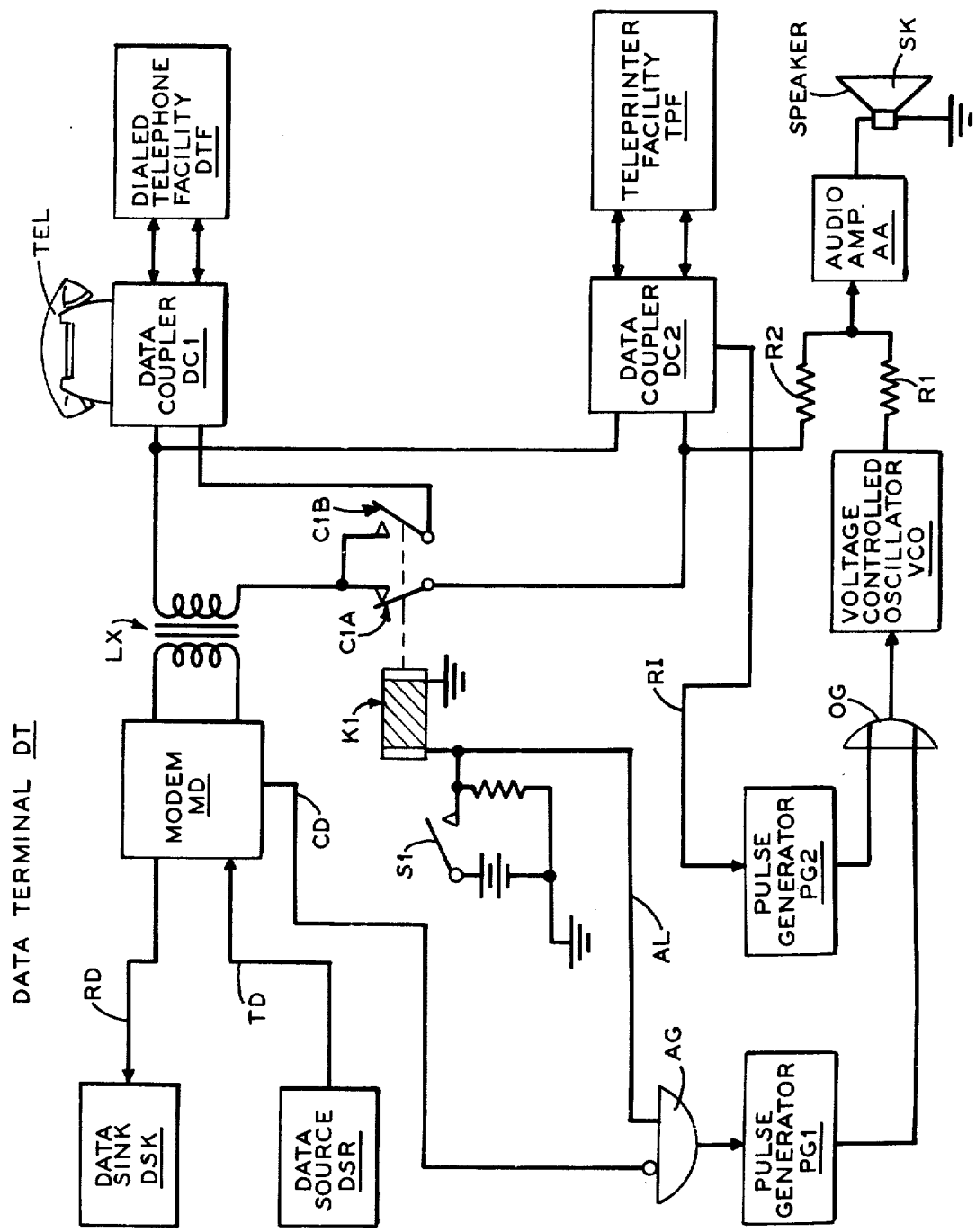

DATA TERMINAL FOR CONNECTION TO TELEPHONE OR TELEPRINTER FACILITIES

This invention pertains to data communication terminals and more particularly to such terminals which can be selectively connected to different communication facilities.

As data processing organizations have become more sophisticated there has developed a trend to provide remote access to the data processing unit via the common carrier facilities such as the dialed telephone facility of, for example, the Bell System or the teleprinter facilities such as TWX or TELEX of Western Union.

Heretofore, the data processing unit was connected to only one facility. However, as remote data processing becomes more universal it is desirable to provide the data processing unit with the ability to be accessed via any one of the presently available common carrier facilities or even private lines or networks.

It is accordingly a general object of the invention to provide such an ability.

When such a system exists and the data processing unit is connected to one of many different facilities provision must be made to indicate when a call is being received from another of the facilities.

It is another object of the invention to provide apparatus which indicates a call from one facility while the unit is connected to another facility.

Other objects, features and advantages of the invention will be apparent from the following detailed description of the invention when read with the accompanying drawing whose sole FIGURE shows by way of example and not limitation, a block diagram of apparatus for realizing the invention.

The system shown in the drawing comprises a data terminal DT connected to the dialed telephone facility DTF such as the Bell System and the teleprinter facility TPF such as the TWX network.

The data terminal DT includes the modem MD which controllably connects the data sink DSK and data source DSR via the line transformer LX to the data couplers DC1 and DC2 under control of a switching unit while activity is monitored by an indicating unit.

The switching unit is shown by way of example comprising the relay K1 with contact sets C1A and C1B for selectively connecting the secondary winding of line transformer LX across data coupler DC1 or data coupler DC2. Relay K1 is energized by the closure of manually operable switch S1. While a manually operable switch is shown it should be realized more sophisticated electronic switching units can and usually would be utilized to perform the required switching functions.

The indicating unit comprises the speaker SK driven by audio amplifier AA which has an input connected via resistor R1 to voltage controlled oscillator VCO and via resistor R2 to data coupler DC2. Oscillator VCO is a tone generator that is keyed on and off by various duty cycle pulses from pulse generator PG1 which is connected via AND-circuit AG to modem MD and from pulse generator PG2 which is connected to data coupler DC2.

In operation, it is assumed that the terminal DT is normally connected to teleprinter facility TPF. Thus, data can flow between the data source and sink of data terminal DT and a remote terminal connected into the teleprinter facility TPF. Of course, before data actually flows the usual protocols are performed. However, since these are well known and do not form part of the invention, they will not be discussed.

If a call arrives from the dialed telephone facility DTF, and assuming non-automatic answering, a local attendant or operator answers the call with telephone TEL connected to coupler DC1. If no data is then being received from the teleprinter facility TPF, the operator can immediately connect the terminal to receive data from the telephone facility. If, however, data is being received the operator can wait until the end of the message to make the connection.

In either event, the operator closes switch S1 energizing relay K1 whose contact sets C1A and C1B switch states to connect data coupler DC1 to the secondary winding of line transformer LX.

Now data can be transferred between the sink DSK and source DSR of data terminal DT and another terminal connected to the dialed telephone facility DTF.

Note that when switch S1 was closed the level on line AL went high alerting AND-circuit AG. However, as long as a signal is present on line CD which is connected to an inverting input of AND-circuit AG no signal passes to pulse generator PG1. A signal will be present on line CD as long as there is a connection between the terminal DT and the remote terminal since line CD is connected to the carrier detect terminal of the modem and carrier will be present as long as the connection between terminal DT and the remote terminal exists. When the connection is interrupted, the output of AND-circuit AG goes high causing pulse generator PG1 to free-run at a characteristic frequency and duty cycle indicative of line interrupts. The pulses from pulse generator PG1 pass through OR-circuit OG to key on and off voltage controlled oscillator VCO (a 400 hz sinusoidal oscillator). The signal from the oscillator passes via resistor R1 to audio amplifer AA which drives speaker SK to emit an audio signal to alert the operator to the fact that the telephone communication has been interrupted.

If while the data terminal is connected to the telephone facility, and a teleprinter call arrives, this fact is indicated by data coupler DC2 transmitting a ring indicating signal to line RI which activates pulse generator PG2 to free run at another characteristic frequency and duty cycle. The pulses from generator PG2 pass through OR-circuit OG to key on and off oscillator VCO and speaker SK emits an audio signal which is characteristic of a call from the teleprinter facility.

The operator responds to the call by opening switch S1 causing the deenergization of relay K1 and the reconnection of coupler DC2 to the secondary winding of transformer LX.

Since the AND-circuit, the OR-circuit, the pulse generators, the voltage controlled oscillator, the relay, the switch, the line transformer, the audio amplifier and the speaker are all conventional and well known devices they will not be discussed any further. However, the data sink can take on many forms, such as the interface or I/O portion of a central processing unit or a minicomputer, a storage device, a printer, etc., while the data source can also be the interface or I/O portion of a central processing unit or a minicomputer, a storage device, a keyboard, etc.

The modem can be one of any presently available modulator-demodulator devices. For example, a suitable modem is a VA300 Series OEM Data Set manufactured by the VADIC CORPORATION of Palo Alto, Calif. 94303 and described in their Data Sheet 7113 of April, 1971. The Data Coupler DC1 and telephone TEL can be those which are shown and described particularly on pages 1, 2 and 3 of Bell Systems publication "Data Couplers CBS and CBT for Automatic Terminals". The Data Coupler DC2 can be the Data Coupler 1001 as shown and described in the Technical Information Manual entitled "TWX ACCESS ARRANGEMENT" published by Western Union, Mahwah, N.J.

While only one embodiment of the invention has been shown and described in detail there will now be obvious to those skilled in the art many modifications and variations satisfying many or all of the objects of the inventions but not departing from the spirit thereof as defined by the appended claims.

What is claimed is:

1. A data terminal comprising: a modem having a pair of signal transfer terminals, a data output terminal, a data input terminal, and a carrier output terminal for giving an indication when the modem is receiving a signal at the signal transfer terminals; a line transformer having first and second windings, said first winding being connected to said pair of signal transfer terminals; a first data coupler for connection to a dialed telephone facility, said first data coupler having a pair of signal transfer terminals, one of said signal transfer terminals being connected to one end of the second winding of said line transformer; a second data coupler for connection to a teleprinter facility, said second data coupler having a pair of signal transfer terminals, one of said signal tranfer terminals being connected to said one end of the second winding of said line transformer, and having a ring indicating terminal for emitting a signal when the teleprinter facility sends a ringing signal; a switch means having switching means for alternately connecting the other signal transfer terminal of said first data coupler or said second data coupler to the other end of the second winding of said line transformer, and having output means for giving an indication when said first data coupler is connected across the second winding of said line transformer; and a signalling means comprising first means for giving an indication that a call between the data terminal and the dialed telephone facility is ended when the carrier output terminal of said modem is not giving an indication while the output means of said switch means is giving an indication that said first data coupler is connected across the second winding of said line transformer, and second means for giving a different indication upon receipt of a signal from the ring indicating terminal of said second data coupler.

2. The data terminal of claim 1 wherein said signalling means comprises a speaker, an audio amplifier having an output connected to said speaker and an input, a voltage-controlled oscillator having an output connected to the input of said audio amplifier and an input, first and second pulse generators having outputs connected to the input of said voltage-controlled oscillator, said first pulse generator responsive to the absence of an indication from the carrier output terminal of said modem while the output means of said switch means is giving an indication to transmit pulses of a first frequency and duty cycle to said voltage-controlled oscillator, said second pulse generator responsive to the signal from the ring indicating terminal of said second data coupler to transmit pulses of a second frequency and duty cycle to said voltage-controlled oscillator.

* * * * *